United States Patent [19]
Ames

[11] Patent Number: 5,724,125
[45] Date of Patent: Mar. 3, 1998

[54] DETERMINATION OF WIND VELOCITY USING A NON-VERTICAL LIDAR SCAN

[76] Inventor: Lawrence L. Ames, 1218 Willow St., San Jose, Calif. 95125-4337

[21] Appl. No.: 263,820

[22] Filed: Jun. 22, 1994

[51] Int. Cl.$^6$ ............................ G01P 3/36; G01S 13/58
[52] U.S. Cl. .................. 356/28.5; 356/5.01; 342/107; 342/109
[58] Field of Search ................. 356/5.01, 28.5; 342/104, 107, 109, 114, 117

[56] References Cited

U.S. PATENT DOCUMENTS

| | | | |
|---|---|---|---|
| 3,984,685 | 10/1976 | Fletcher et al. | 356/28.5 |
| 4,167,329 | 9/1979 | Jelalian et al. | 356/28.5 |
| 4,652,122 | 3/1987 | Zincone et al. | 356/28.5 |
| 4,875,770 | 10/1989 | Rogers et al. | 356/28.5 |
| 5,048,951 | 9/1991 | Combe et al. | 356/28.5 |
| 5,170,218 | 12/1992 | Keene | 356/28.5 |
| 5,313,263 | 5/1994 | Abbiss et al. | 356/28.5 |

*Primary Examiner*—Stephen C. Buczinski
*Attorney, Agent, or Firm*—Fenwick & West LLP

[57] ABSTRACT

A system and method for determining wind velocity. The LIDAR 104 transmits a plurality of laser pulses. The paths of the laser pulses surround a center line (206) that does not coincide with a vertical axis (706) intersecting the LIDAR (104), i.e., an off-vertical scan. Each laser pulse reflects off particles in the air at a given location. This location is the intersection of the path of each LIDAR pulse and the target altitude. The target altitude is the altitude at which the wind velocity is to be determined. The reflected pulses are received by the LIDAR (104). The invention groups the received LIDAR pulses according to the altitude at which they were reflected, as opposed to the distance each pulse travels. Grouping the received pulses in this manner enables the invention to perform an off-vertical scan that accurately determines the wind velocity at a target altitude. The received laser pulses have an associated Doppler shift. The Doppler shift is a measure of the relative radial wind velocity at the target location. The invention measures the Doppler shift from a plurality of received laser pulses reflected from the target altitude. These measurements enable the invention to determine the wind velocity at the target location.

18 Claims, 9 Drawing Sheets

FIG_3
PRIOR ART
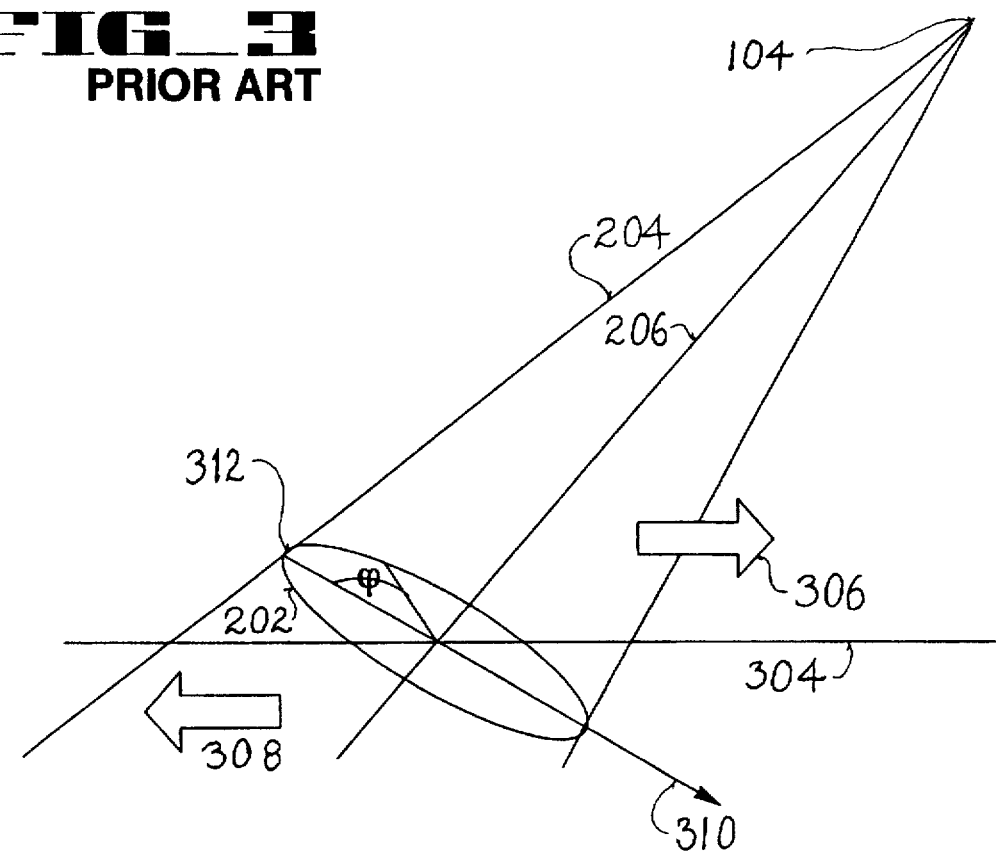
FIG_4
PRIOR ART
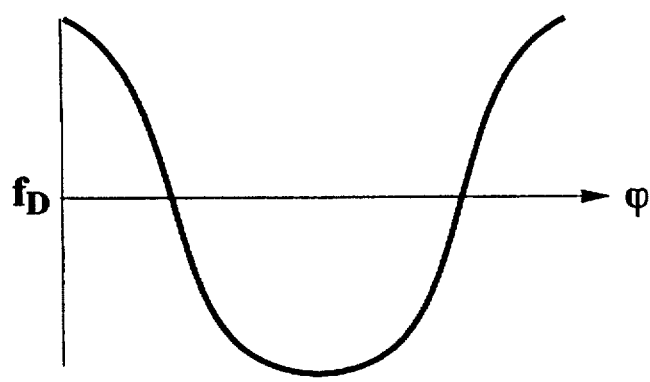

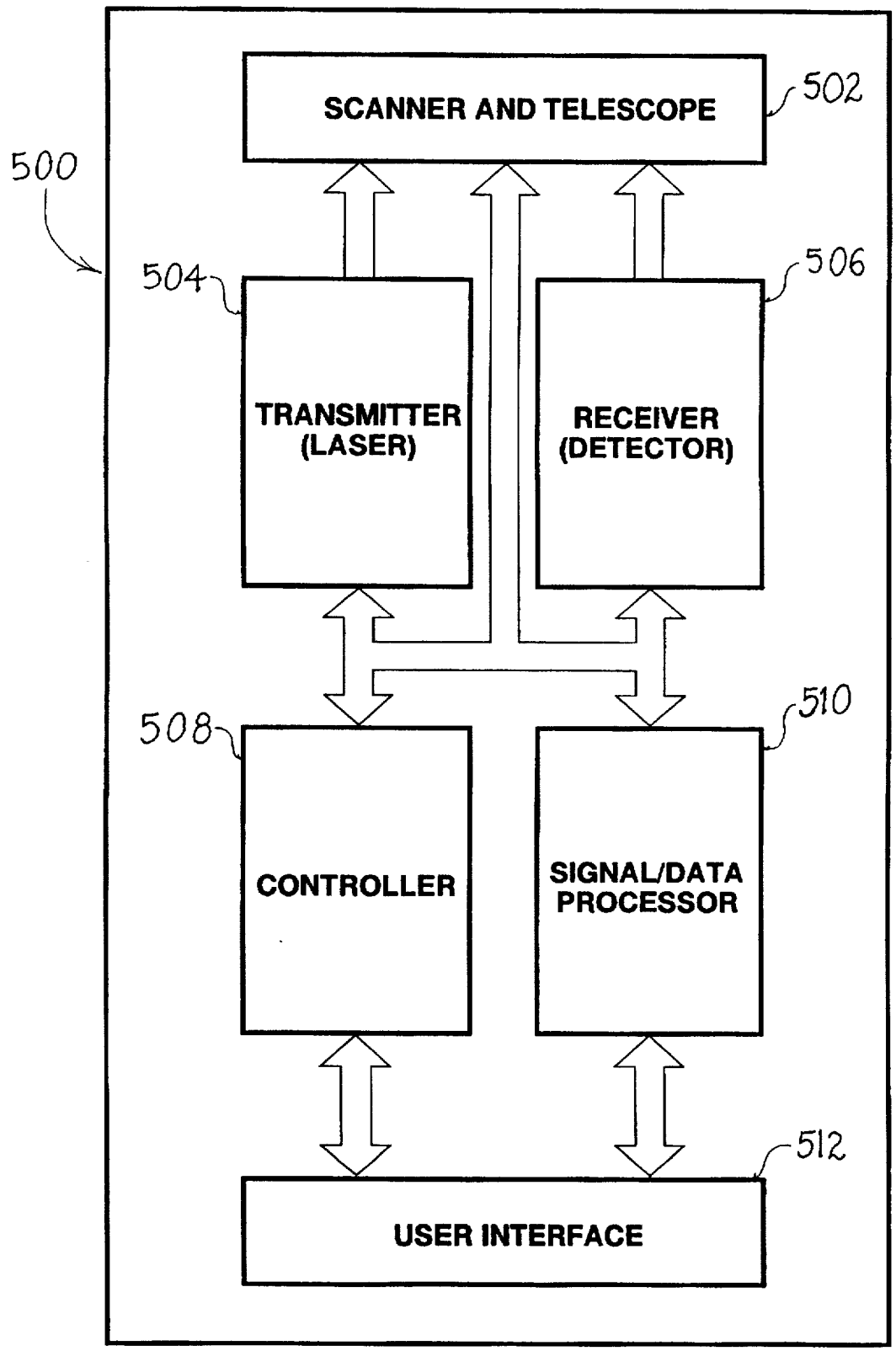

FIG_6A
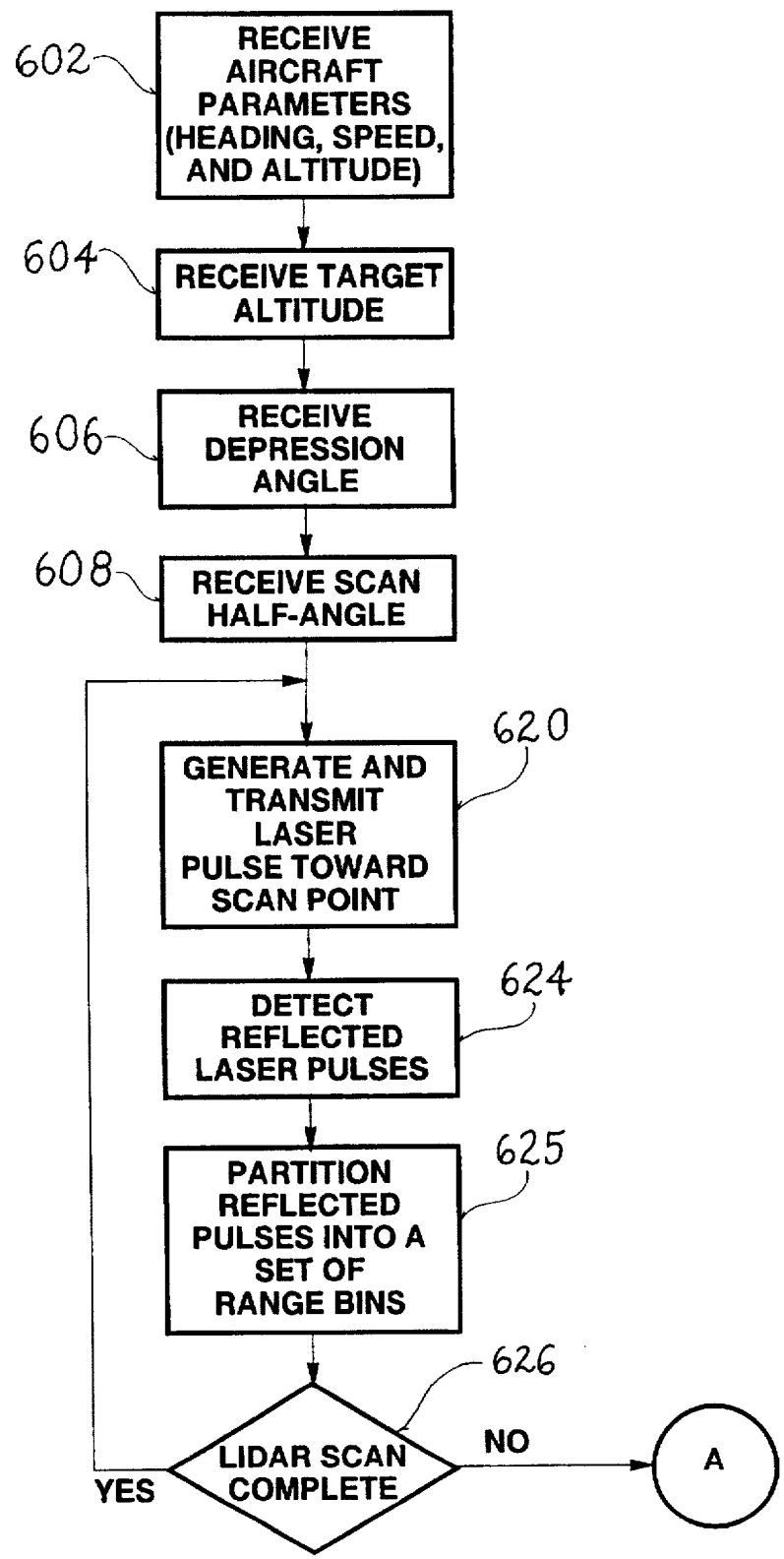

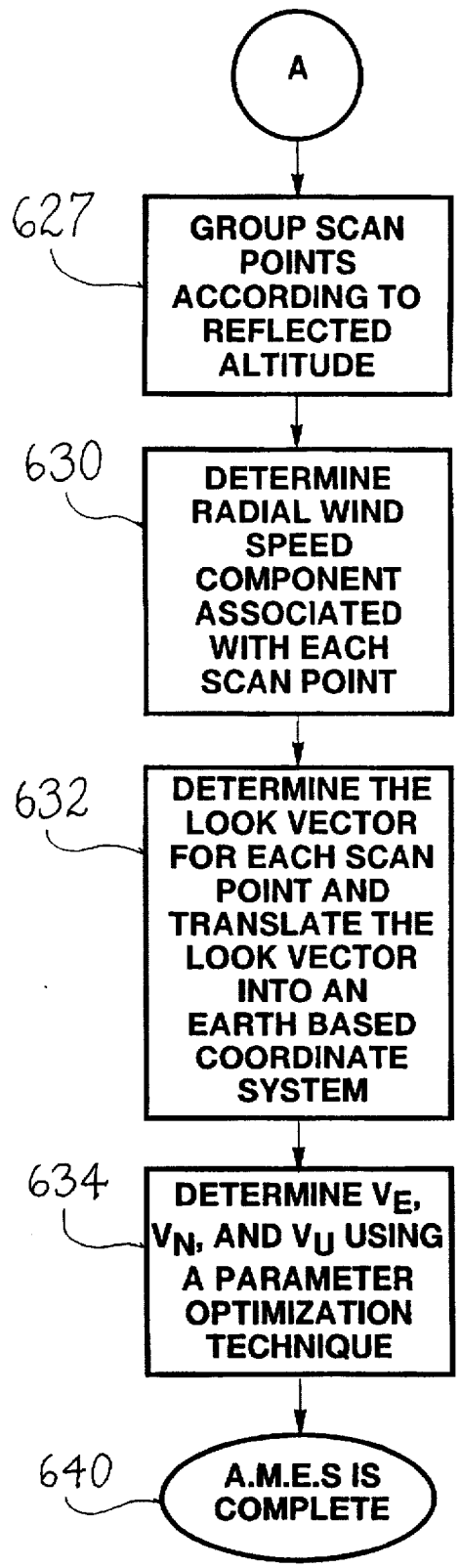
FIG_6B

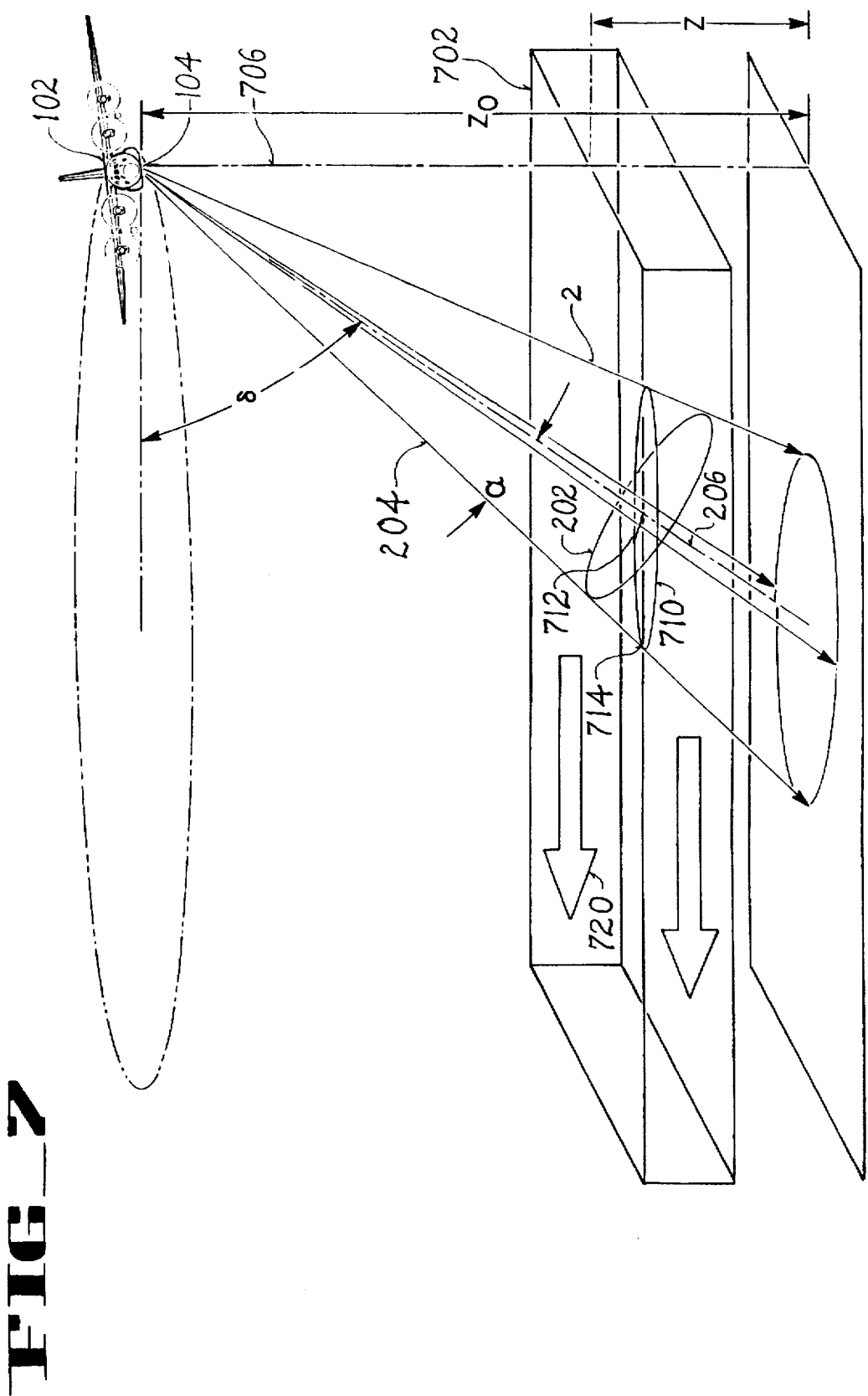
FIG_7

FIG_8
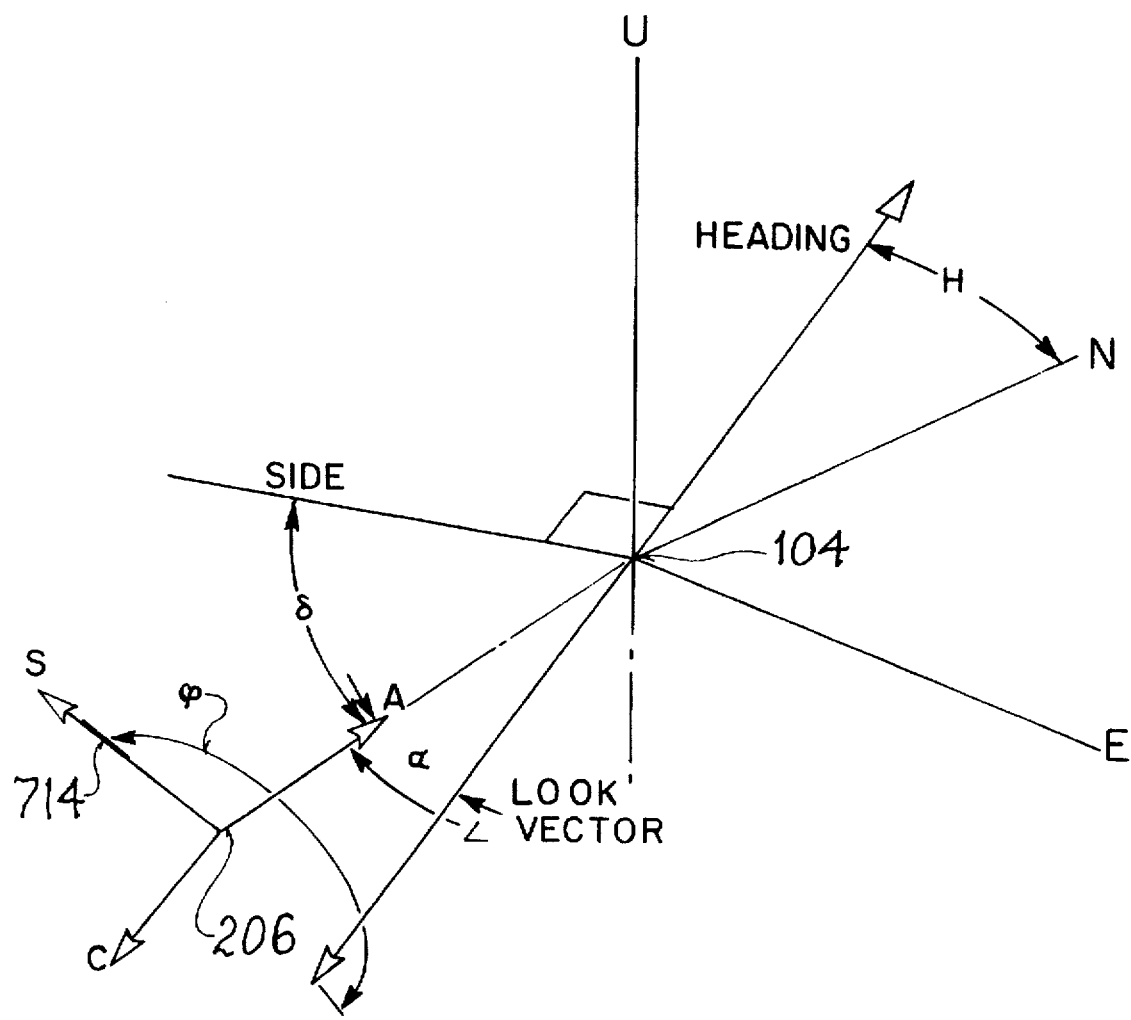

FIG_9
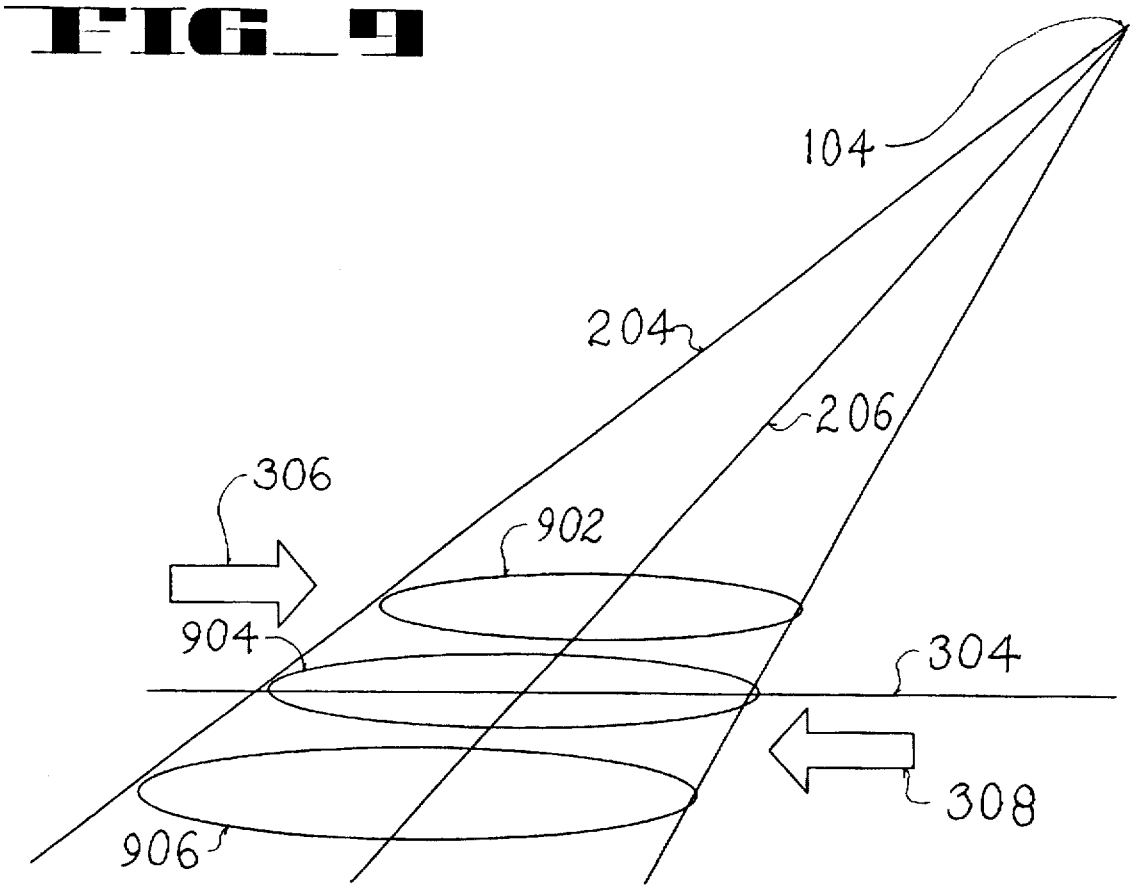
FIG_10
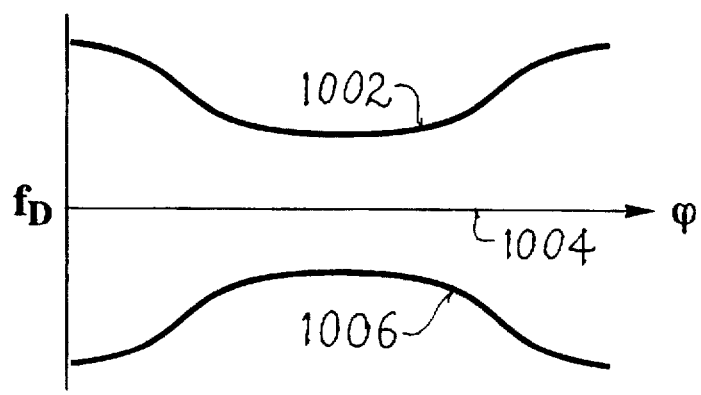

DETERMINATION OF WIND VELOCITY USING A NON-VERTICAL LIDAR SCAN

1. Field of the Invention

The invention relates generally to the field of wind velocity measurement, particularly to velocity azimuth display (VAD), more particularly to determining a wind speed and direction using an off-vertical Light Direction and Range (LIDAR) system.

2. Background of the Invention

Determining wind velocity, i.e., wind speed and direction, at varying altitudes is often a difficult task because the velocity of the wind frequently differs at varying altitudes. Generally, air travels uniformly, i.e., at approximately the same speed and direction, within a horizontal layer of air. The variance in wind velocity as the altitude increases is called a wind velocity vertical gradient. Two adjacent horizontal layers of air whose relative wind velocity difference is high can cause an effect called "wind shear." It is often important to determine when a wind shear is present. Therefore, many techniques have been attempted to accurately determine wind velocity at different altitudes. Some of these techniques are discussed below.

One technique for determining the wind velocity of air directly overhead is to fill a balloon with helium and permit the balloon to rise. An observer watches the balloon for alterations in course as the balloon rises. These alterations are translated into wind speed and wind direction measurements.

Another technique for determining the wind velocity at an altitude directly above or below a sensor is described with reference to FIG. 1. In FIG. 1 an aircraft 102 uses a LIDAR system 104 to sense the wind velocity at an altitude directly below the aircraft 102. The LIDAR system 104 is located on a platform, e.g., an aircraft 102, at an altitude $Z_0$. In a LIDAR system 104 a laser pulse is emitted. The laser pulse is scattered by particles at a target altitude, Z. The scattered, i.e., reflected, laser pulse is sensed by the LIDAR system 104. The LIDAR determines the duration between the time the laser pulse is emitted and the time the pulse is received. The laser pulse travels at the speed of light. Therefore, the LIDAR can determine the distance the laser pulse traveled and, accordingly, the altitude at which the reflection of the laser pulse occurs. Received laser pulses having approximately the same travel duration are stored in range bins associated with the propagation distance within these prior LIDAR systems.

The shape of the search pattern formed by the laser is conical 116. The half-scan angle 106 of the LIDAR system determines the width of the cone. The LIDAR system determines the wind velocity at a target altitude, Z, using the received laser pulses stored in the range bin that corresponds to the distance between the LIDAR system $Z_0$ and the target altitude Z. The search pattern 110 for a particular range bin, corresponding to a target altitude, Z, is wholly contained at the target altitude. A problem occurs when attempting to determine the wind velocity at a particular location that is not on a vertical axis with respect to the location of the LIDAR system 104. This problem is illustrated in FIG. 2. One example illustrating the usefulness of determining the wind velocity at a location not directly above or below the aircraft 102 occurs when the aircraft 102 is ascending or descending. The crew on the aircraft 102 may want to determine the wind velocity at the various positions that they will travel through.

Another example of such a situation occurs when attempting to precisely drop supplies, e.g., via parachute, in a location where the safety of the aircraft 102 may be compromised by flying directly over the drop location. The aircraft 102, ideally, will circle the drop location at a safe distance in order to determine the wind velocity at various altitudes. The supplies can then be released at a location such that the drift caused by the wind at the various altitudes between the release location and the drop location are accounted for.

In FIG. 2 the center line 206 of the conical search pattern 204 does not coincide with an axis vertical to the location of the LIDAR system 104. Therefore, the search pattern 202 for a particular range bin extends above and below the target altitude, Z. If the target altitude Z is close to a strong wind shear, the accuracy of prior systems, i.e., constant range bin systems, is decreased significantly.

FIGS. 3 and 4 illustrate an example of a prior LIDAR system that attempts to determine the wind velocity at an altitude near an air layer edge 304. In FIG. 3, the direction of the wind above the edge 304 is indicated by an eastward pointing arrow 306. The direction of the wind below the edge 304 is indicated by a westward pointing arrow 308. The angle φ represents the scanner phase, discussed below. Each reflected laser pulse that is received by the LIDAR has a Doppler shift, $f_D$, associated with it. A Doppler shift is a shift in the frequency of a laser pulse when reflected off an object having a radial velocity with respect to the receiver. The graph showing the Doppler shift $f_D$ verses φ is given in FIG. 4. The angle φ increases in a clockwise direction with φ equal to zero at location 312. In the orientation illustrated by FIG. 3, the eastward wind 306 causes a positive Doppler shift to be detected by the LIDAR system when φ is greater than 270 degrees and less than 90 degrees. The westward wind 308 causes a negative Doppler shift to be detected by the LIDAR system when φ is greater than 90 degrees and less than 270 degrees. The curve of FIG. 4 will erroneously be interpreted as representing a wind descending sideways at the target altitude, Z, i.e., a wind traveling in the direction indicated by the arrow 310.

It is therefore desirable to have a LIDAR system which enables the wind velocity of a target location to be accurately determined when the target location is not directly above or below the LIDAR system.

SUMMARY OF THE INVENTION

The present invention is a system and method for determining wind velocity. The LIDAR 104 transmits a plurality of laser pulses surrounding a center line (206). The center line (206) does not coincide with a vertical axis (706) that intersects the LIDAR. That is, the LIDAR transmits the laser pulses located about an off-vertical angle.

Each laser pulse reflects off particles in the air at a given location at a target altitude. This location is the intersection of the transmission path 204 of each LIDAR pulse and the target altitude. The target altitude is the altitude at which the wind velocity is to be determined. Reflected pulses are received by the LIDAR (104).

The present invention does not look at all of the received LIDAR pulses in a particular range bin. Instead, the present invention groups the received LIDAR pulses according to the altitude at which they were reflected. Grouping the received pulses in this manner enables the LIDAR system (500) to perform an off-axis scan that accurately determines the wind velocity at a target location.

The received laser pulses have an associated Doppler shift. The Doppler shift is a measure of the radial wind velocity at the target location. The invention measures the Doppler shift from a plurality of received laser pulses reflected from the target altitude. These measurements enable the invention to determine the wind velocity at the target location.

BRIEF DESCRIPTION OF THE DRAWINGS

FIG. 3 is an illustration of an off-vertical axis LIDAR scan using a constant range bin technology in a wind shear environment.

FIG. 4 is an illustration of the Doppler shift resulting from the off-axis LIDAR scan of FIG. 3.

FIG. 5 is an illustration of the environment in which the preferred embodiment resides.

FIGS. 6A–6B are flow diagrams showing the general method of the preferred embodiment.

FIG. 7 is an illustration of an off-axis LIDAR scan using the constant altitude bin according to the preferred embodiment.

FIG. 8 is an illustration of a look vector and several coordinate systems according to the preferred embodiment.

FIG. 9 is an illustration of an off-vertical axis LIDAR scan using a constant altitude bin technology in a wind shear environment.

FIG. 10 is an illustration of the Doppler shift resulting from the off-axis LIDAR scan of FIG. 9.

DETAILED DESCRIPTION OF THE PREFERRED EMBODIMENTS

Figure 2:
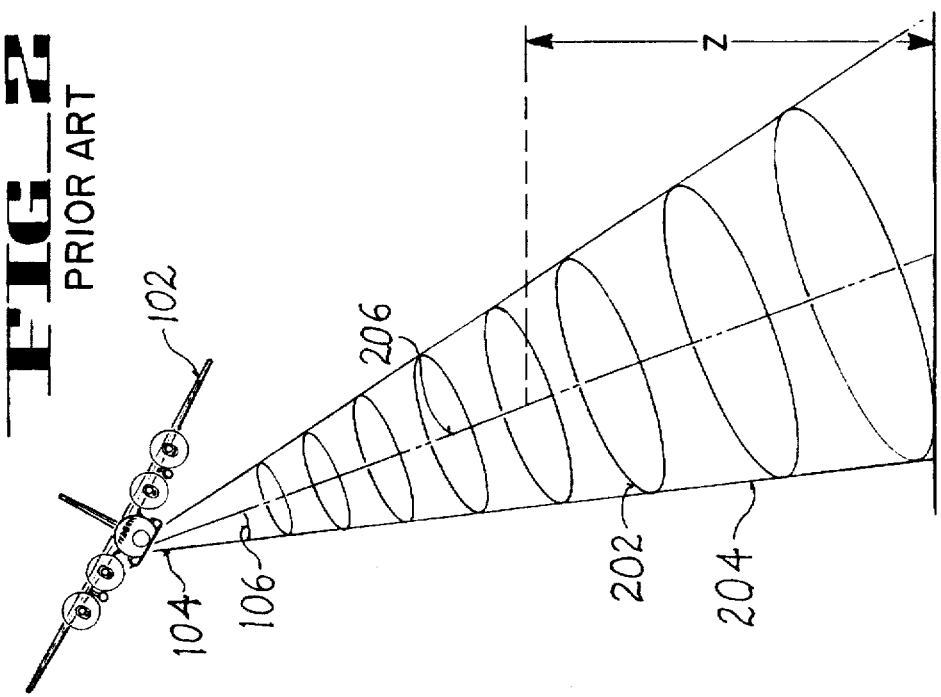
FIG. 2 is an illustration of an off-vertical axis LIDAR scan using a constant range bin technology.
Figure 1:
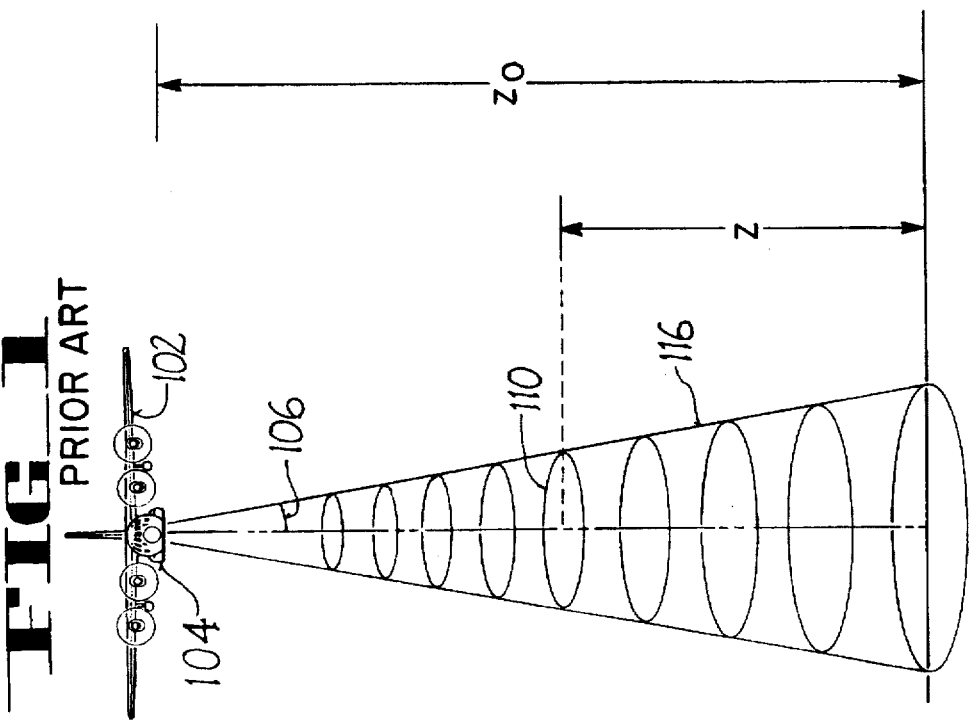
FIG. 1 is an illustration of a vertical axis LIDAR scan using a constant range bin technology.

A preferred embodiment of the present invention is now described with reference to the Figures, where like reference numbers indicate identical or functionally similar elements. Also in the Figures, the left most digit(s) of each reference number corresponds to the Figure in which the reference number is first used.

The invention is directed to a VAD system using LIDAR having a number of innovative features, for example the current invention groups reflected laser pulses according to a common altitude, i.e., an altitude bin, as opposed to a common range. The invention creates an altitude bin by determining the distance necessary for each LIDAR transmission pulse to intersect the target altitude. Only pulses reflected from the target altitude are placed in the altitude bin. Altering the laser pulse grouping enables the invention to accurately determine the wind velocity at a target location where the path between the LIDAR and the target location is not vertical.

FIG. 5 illustrates one embodiment of the present invention. A LIDAR 500 produces, transmits, receives and manipulates a laser pulse signal, hereafter referred to as a laser pulse. The LIDAR 500 has a scanner and telescope 502. The scanner and telescope aims and transmits the laser pulse, i.e., the electromagnetic (EM) wave, and receives the reflection of the laser pulse from particles in the path of the laser pulse. The laser pulse in the preferred embodiment has a high frequency, i.e., a frequency in the infrared light range (approximately $1.5 \times 10^{14}$ Hertz (Hz)).

The transmitter 504 transmits the laser pulse in response to signals received from the controller 508. The transmitter 504 transmits the laser pulse along a transmission path. In the preferred embodiment, a plurality of laser pulses are transmitted along each of approximately twenty different transmission paths. Measurements from multiple laser pulses along a given transmission path are combined to give a single set of measurements with increased accuracy. The transmission paths define a cone, surrounding the center line, described above. In the preferred embodiment the center line 208 is not vertical with respect to the receiver 506.

As stated above, the transmitted pulse propagates along the transmission path. Along the transmission path are particles, e.g., dust, water, and pollutants, e.g., aerosols, which reflect portions of the laser pulse. Therefore, the laser pulse is reflected, i.e., scattered, as it travels along the transmission path. The LIDAR receiver 506 senses the reflected portions of the laser pulse at various times. The laser pulse propagates at the speed of light. Therefore, the time differential between the transmission by the transmitter 504 and the sensing by the receiver 506 defines the distance traveled by the laser pulse.

In the preferred embodiment the LIDAR categorizes each reflected and detected laser pulse, hereafter a reflected laser pulse, into a plurality of range bins. Each range bin defines a small range, along the transmission path, within which the LIDAR is reflected.

The receiver 506 outputs signals to the signal/data processor 510 representing a Doppler shift associated with each reflected laser pulse. The Doppler shift associated with each reflected laser pulse represents the relative radial velocity of the reflective particles, and therefore the radial wind speed, at the range bin associated with the reflected pulse.

The signal/data processor 510 receives a plurality of signals from the receiver 506, representing the Doppler shifts at each range bin of each received laser pulse, and determines the wind velocity based upon these Doppler shifts. The wind velocity is displayed to the user via the user interface 512. The technique for determining the wind velocity from the Doppler shift is given below.

The preferred embodiment uses a transmitter 504 and a receiver 506 manufactured by Coherent Technologies, Inc. located in Boulder, Colo. The controller 508, signal/data processor 510 and the user interface 512 are manufactured by Lockheed Missles & Space Company, Inc., located in Palo Alto, Calif. The functions performed by the LIDAR components 502–512 are discussed below with reference to FIGS. 6A and 6B.

FIGS. 6A and 6B illustrate a flow diagram describing the method of the invention. The flow diagram is described below with reference to FIGS. 7–8. FIG. 7 illustrates an example of a LIDAR system using the method of the invention. In the preferred embodiment the invention is used from an aircraft 102. In alternate embodiments the invention is used from the ground. In FIG. 7, a layer of air 702 at the target altitude Z is moving with the velocity shown by arrow 720.

The LIDAR 500 is provided 602 with the aircraft parameters, e.g., aircraft heading, speed, and altitude. The user interface 512 receives this information directly from the aircraft 102 or from a user who manually enters the information. The information is sent to the signal/data processor 510. The LIDAR is provided 604 with the target altitude, Z. The target altitude, Z, is the altitude at which the wind velocity is to be determined.

The LIDAR is provided 606 with the depression angle (δ). The depression angle is the angle between the horizontal plane at the altitude of the aircraft and the center line 206. In FIG. 7, the depression angle is shown as δ. In the preferred embodiment δ is not equal to 90 degrees or 270 degrees. Therefore, the center line 206 does not coincide with a vertical axis 706 passing through the LIDAR 104. The depression angle is received by the user interface 512 and is used by the signal/data processor 510 as described below. The LIDAR is provided 608 with the scan half-angle (α). The scan half-angle α is the angle between the transmission path and the center line 206. In FIG. 7, the scan half-angle is shown as α. This information is received by the user interface 512 and is used by the signal/data processor 510, as described below.

The controller 508 instructs the transmitter 504 to perform a LIDAR scan. During a LIDAR scan, the transmitter 504 transmits 620 a plurality of laser pulses along approximately twenty transmission paths around the center line 206 at the scan half-angle. For each laser pulse the receiver 506 detects 624 a plurality of reflected laser pulses, associated with each transmitted laser pulse. The reflected laser pulses are placed 625 into a plurality of range bins. Each new transmitted laser pulse results in a stream of reflected laser pulses which are placed into a new set of range bins. The result of a LIDAR scan is a plurality range bins for each transmission path. Steps 620–625 are repeated until the controller determines 626 that the LIDAR scan is complete.

In previous systems only detected pulses from range bins associated with a constant distance are utilized to determine wind velocity at a particular altitude. In contrast, the present invention utilizes reflected laser pulses from range bins associated with different distances to determine the wind velocity at the target altitude. For each transmitted laser pulse the distance from the LIDAR to the target altitude is dependent upon the depression angle δ, the scan half-angle α, and the scanner phase angle φ for each transmitted laser pulse. The following technique is used by the signal/data processor 510 to determine the proper range bin to be utilized for each transmitted laser pulse.

The signal/data processor 510 determines 627 the distance (R) between the LIDAR position on the aircraft 104 and a scan point 712. A scan point 712 is the intersection between the transmission path of the current laser pulse and the target altitude Z. As stated above, in previous systems this distance is the same for all scan points within a LIDAR scan. In the preferred embodiment, the distance, R, between the LIDAR 104 and a particular scan point is determined 616 using equation (1).

$$R = \frac{Z_0 - Z}{\sin(\delta)\cos(\alpha) - \cos(\delta)\sin(\alpha)\cos(\phi)} \quad \text{(Eq. 1)}$$

In equation (1) $Z_0$ is the aircraft altitude, Z is the target altitude, δ is the depression angle, α is the scan-half angle, and φ is the phase angle. A plurality of laser pulses, grouped into approximately twenty transmission pulses, are reflected from the target altitude, as determined by equation (1), and are grouped together by the signal/data processor 510 into an altitude bin. That is, for each transmitted laser pulse the associated range bin corresponding to the distance R, as determined by equation (1) is grouped into the altitude bin associated with the target altitude.

The reflected laser pulses associated with the altitude bin are utilized to determine the wind velocity at the target altitude. The technique for determining the wind velocity based on these reflected pulses is set forth below.

The frequency of each of the reflected pulses is Doppler shifted. The Doppler shift represents the relative radial velocity of the particles, at the scan point 712, i.e., the position where the laser pulse reflection occurs. The radial velocity is the velocity component of the particle in the direction of the transmission path. The Doppler shift is "relative" because the velocity of the aircraft 102 affects the amount of Doppler shift. The radial velocity of the aircraft is the velocity of the aircraft 102 in the direction of the transmission path. The radial velocity of the aircraft 102 is known because the aircraft speed is known. Therefore, the Doppler shift of the aircraft 102 is accounted for by the signal/data processor 510. If the radial component of the velocity of the particle at the scan point 712, defined below, is directed toward the LIDAR 104, the frequency of the reflected laser pulse signal is higher than the transmitted laser pulse signal. Conversely, if the radial component of the velocity of the particle at the scan point 712 is directed away from the LIDAR 104, the frequency of the reflected laser pulse signal is lower than the transmitted laser pulse signal.

A look vector is associated with each transmission path. A look vector is a unit vector pointing along the transmission path. The radial wind speed component, $V_{Ri}$ described above, is the dot product of the look vector ($L_i$) and the actual wind speed at the target altitude ($V_E$, $V_N$, AND $V_U$), as shown in equation 2. In an earth based coordinate system, i.e., East, North, and Up as shown in FIG. 8, the actual wind speed has three components $V_E$, $V_N$, AND $V_U$. These three unknowns can be calculated by determining the Doppler shift associated with three scan points at the target altitude.

$$V_{R1} = [\bar{L}_1 \cdot (V_E, V_N, V_U)] \quad \text{Eq. (2)}$$

$$V_{R2} = [\bar{L}_2 \cdot (V_E, V_N, V_U)]$$

$$\vdots$$

$$V_{RN} = [\bar{L}_N \cdot (V_E, V_N, V_U)]$$

Only three scan points are necessary to solve for the three unknowns. However, the preferred embodiment uses approximately twenty scan points, i.e., N=20 in equation (2). More than three scan points are used to reduce errors that can be introduced by spurious reflections, e.g., a laser pulse reflection from a bird. One technique for determining the actual wind speed from the Doppler shifts is set forth below with reference to FIG. 8.

FIG. 8 is a graphical illustration of step 632. An orthogonal, right-handed, earth-based coordinate system is indicated by E, N and U (East, North, Up) in FIG. 8. The aircraft 102 is located at the origin of the coordinate system 104. The aircraft 102 is headed along the line labeled heading, having an angle H relative to north. The angle H is negative in this example because the coordinate system is defined such that the heading is measured clockwise from north. The LIDAR 104 transmits from the left side of the aircraft 102 ("side"), at a depression angle δ. The depression angle δ is measured from horizontal plane at the altitude of aircraft 102. The LIDAR 104 is pointed along the transmission path and is transmitted around the center line 206. The look vector is the unit vector in the direction of the transmission path. The depression angle δ is measured from the horizontal plane, defined above, to the center of the LIDAR scan pattern, i.e., to the .center line 206, not to the instantaneous transmission path. When the LIDAR 104 transmits around the center line 206 the angle between the center line 206 and the transmission path is the scanner half-angle α. phase angle φ defines the angle around the center line 206 of the scan point 712. φ is measured clockwise from the twelve o'clock position 714, when viewed from the left side of the aircraft.

As stated above, the only wind velocity component that can be determined from any scan point is the radial component of the actual wind velocity. As described above, with reference to equation 2, the radial component of the relative wind speed is equal to the dot product of the look vector and the relative wind velocity. In order to determine the relative three dimensional wind velocity at the target altitude, the preferred embodiment first resolves 632 each look vector into a three dimensional vector in a LIDAR coordinate system, i.e., sideways, cross range, aligned (S, C, A). The coordinates for the look vector in the LIDAR coordinate system are shown in equation (3).

$$\bar{L} = \begin{bmatrix} S \\ C \\ A \end{bmatrix} = \begin{bmatrix} \sin\alpha\cos\phi \\ -\sin\alpha\sin\phi \\ -\cos\alpha \end{bmatrix} \quad \text{(Eq. 3)}$$

In order to calculate equation (2), the look vector, defined by equation (3) is converted 632 into earth based coordinates. The result of this conversion is shown in equation (4).

$$\bar{L}_i = \begin{bmatrix} L_{Ei} \\ L_{Ni} \\ L_{Ui} \end{bmatrix} = \begin{bmatrix} -\cos(H_i)\sin(\delta_i)\sin(\alpha_i)\cos(\phi_i) - \\ \cos(H_i)\cos(\delta_i)\cos(\alpha_i) + \sin(H_i)\sin(\alpha_i)\sin(\phi_i) \\ \sin(H_i)\sin(\delta_i)\sin(\alpha_i)\cos(\phi_i) + \sin(H_i)\cos(\delta_i)\cos(\alpha_i) + \\ \cos(H_i)\sin(\alpha_i)\sin(\phi_i) \\ \cos(\delta_i)\sin(\alpha_i)\cos(\phi_i) - \sin(\delta_i)\cos(\alpha_i) \end{bmatrix} \quad \text{(Eq. 4)}$$

In equation (4) $L_{E1}$, $L_{N1}$, and $L_{U1}$ are the look vector coordinates, for a first look vector, in the east, north, and up directions, respectively. $\alpha_i$ is the scan angle for the $i^{th}$ transmission path. $H_i$ is the aircraft 102 heading when the $i^{th}$ transmission occurs. $\delta_i$ is the depression angle for the $i^{th}$ transmission path. $\phi_i$ is the scan phase for the $i^{th}$ transmission path. When the aircraft is traveling in a straight path, the variables $\alpha_i$, $H_i$, and $\delta_i$ are the same for a target altitude.

Combining equation (4) and equation (2) results in Equation (5) for the $i^{th}$ equation.

$$V_{Ri} = [L_{Ei}V_E + L_{Ni}V_N + L_{Ui}V_U] \quad \text{(Eq. 5)}$$

There are three unknown variables in equation (5), $V_E$, $V_N$, and $V_U$. These variables can be determined by using three or more scan points 712, because each scan point 712 generates a new equation, in the form of equation (5). Each scan point has unique values for the Doppler frequency $f_D$, and the scanner phase, $\phi$. As stated above, the preferred embodiment uses approximately twenty scan points 712 at each altitude. Since each scan point 712 is associated with a unique equation in the form of equation (5) there are approximately twenty equations. Therefore, an over determined system of linear equations exists. This over determined system can be solved by using one of many well known algorithms, such as a least squares technique.

Solving the over determined system of linear equations defines values for $V_E$, $V_N$, and $V_U$. These values are the relative wind velocity components at the target altitude. The actual wind velocity at the target altitude is found by correcting for aircraft motion.

FIGS. 9 and 10 illustrate the use of the invention using the same example discussed above with reference to FIGS. 3 and 4. In the example, three altitudes are scanned. The first scan using the current invention, i.e., using an altitude matching elliptical scan (AMES) 902, is at an altitude where the wind is from the west. The second AMES 904 is at the edge layer altitude 304. The wind velocity at this altitude is zero. The third AMES 906 is at an altitude where the wind is from the east. FIG. 10 illustrates a graph showing the curves representing the Doppler shift $f_D$ verses the scanner phase $\phi$. The first curve 1002 represents the first AMES 902. In the first curve 1002 the Doppler shift is always positive therefore the signal/data processor 510 will correctly determine that the wind is blowing from the west. The second curve 1004 represents the second AMES 904. In the second curve 1004 the Doppler shift is always zero, therefore the signal/data processor 510 will correctly determine that no wind exists at this altitude. The third curve 1006 represents the third AMES 906. In the third curve 1006 the Doppler shift is always negative, therefore the signal/data processor 510 will correctly determine that the wind is blowing from the east. The invention correctly determines the wind velocity at all three altitudes. In comparison, the prior system, as illustrated in FIGS. 3 and 4, incorrectly determines the wind velocity.

Figure 11:
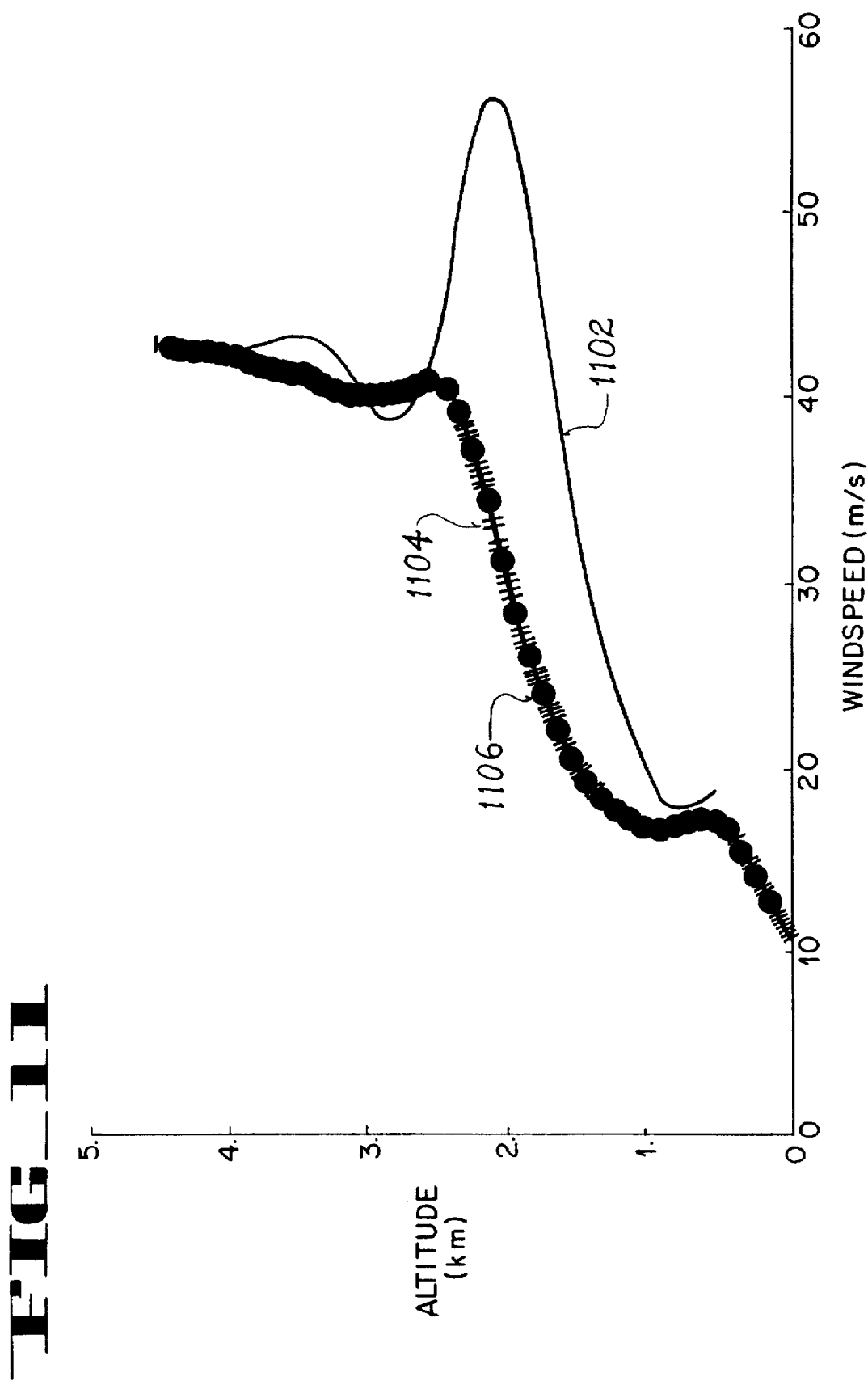
FIG. 11 is an illustration of an experimental result for a LIDAR system according to the preferred embodiment.

The invention was tested on data simulated from balloon wind velocity measurements made at Eglin Air Force Base. The results of this test are shown in FIG. 11. Simulated Doppler shifts were calculated based upon the measured wind velocity profiles. The actual wind velocity profile is represented in FIG. 11 by line 1104. As FIG. 11 illustrates, the actual wind velocity profile exhibits a strong wind shear. The prior system, i.e., a system using a constant range bins (CRB), generated the wind velocity profile represented by line 1102. The CRB system generated errors approaching 100 percent. For example, at an altitude of approximately 2 kilometers (km) the actual wind velocity is approximately 28 meters/second (m/s). However, the CRB system determined that the wind speed was approximately 54 m/s. In contrast, the current invention, i.e., the AMES system, generated the wind velocity profile represented by the circles 1106. The profile generated by the AMES system is nearly identical to the actual wind velocity profile.

The system and method of the invention enable a wind velocity to be determined at a location not directly above or below the sensor. The invention uses a non-vertical LIDAR scan where reflected emissions are grouped according to the altitude at which they are reflected as opposed to being grouped according to the distance the emissions travel.

What is claimed is:

1. A method for obtaining a wind velocity using a signal transmitter located at a first location and a signal receiver located at a second location, comprising the steps of:

transmitting a first signal along a first transmission path from the first location using the signal transmitter, wherein said first signal propagates to a third location, and wherein a first distance is a distance between the first location and said third location along said first transmission path;

receiving a first reflected signal at the second location using the signal receiver, wherein said first reflected signal is said first signal reflected from said third location;

transmitting a second signal along a second transmission path from the first location using the signal transmitter, wherein said second signal propagates to a fourth location, and wherein a second distance is a distance between the first location and said fourth location along said second transmission path, and wherein said second distance is not equal to said first distance, and wherein said third location and said fourth location are at a first altitude;

receiving a second reflected signal at the second location using the signal receiver, wherein said second reflected signal is said second signal reflected from said fourth location; and determining the wind velocity at said first altitude based upon said first reflected signal and said second reflected signal.

2. The method of claim 1, wherein said first distance is determined according to a distance equation, which is:

$$R = \frac{Z_0 - Z}{\sin(\delta)\cos(\alpha) - \cos(\delta)\sin(\alpha)\cos(\phi)}$$

where R is said first distance, $Z_0$ is an altitude of said second location, Z is said first altitude, and $\delta$ is a depression angle, $\alpha$ is a scan half-angle, and $\phi$ is a scanner phase angle associated with said first reflected signal.

3. The method of claim 1, wherein said step of determining the wind velocity at said first altitude comprises the substep of:

determining a first radial velocity and a second radial velocity based upon a first frequency shift associated with said first reflected signal, and a second frequency shift associated with said second reflected signal respectively;

wherein said first radial velocity represents the wind velocity along said first transmission path at said first altitude, and said second radial velocity represents the velocity along said second transmission path at said first altitude.

4. The method of claim 1, wherein the first location and the second location are the same.

5. The method of claim 1, wherein each of said transmission signals is an electromagnetic signal.

6. The method of claim 5, wherein said electromagnetic signal is an infrared signal.

7. A method for obtaining a wind velocity using a signal transmitter located at a first location and a signal receiver located at a second location, comprising the steps of:

transmitting a plurality of transmission signals, using the signal transmitter along a plurality of transmission paths, wherein each of said transmission signals propagates along one of said transmission paths;

receiving a plurality of reflected signals using the signal receiver, wherein each of said reflected signals is associated with one of said transmission signals that has been reflected at an altitude, and wherein each of said reflected signals is associated with one of a plurality of altitude groups, wherein each of said reflected signals associated with a first altitude group of said altitude groups is reflected from a first altitude; and determining the wind velocity at said first altitude using said reflected signals associated with said first altitude group.

8. The method of claim 7, wherein a first propagation distance for a first reflected signal, associated with said first altitude group, is not equal to a second propagation distance for a second reflected signal associated with said first altitude group, wherein said first propagation distance and said second propagation distance are equal to a distance from said first location to said first altitude, along said transmission path associated with said first reflected signal and said second reflected signal, respectively.

9. The method of claim 8, wherein said first propagation distance is determined according to a distance equation, which is:

$$R = \frac{Z_0 - Z}{\sin(\delta)\cos(\alpha) - \cos(\delta)\sin(\alpha)\cos(\phi)}$$

where R is said first propagation distance, $Z_0$ is an altitude of said second location, Z is said first altitude, and $\delta$ is a depression angle, $\alpha$ is a scan half-angle, and $\phi$ is a scanner phase angle associated with said first reflected signal.

10. The method of claim 7, wherein said first and second locations are the same.

11. The method of claim 7, wherein said transmission signals are reflected by one of a water droplet, a dust particle, and a pollutant.

12. The method of claim 7, wherein each of said transmission signals is an electromagnetic signal.

13. The method of claim 12, wherein said electromagnetic signal is an infrared signal.

14. A system for determining a wind velocity at a first altitude, comprising:

a transmitter, located at a first location, for transmitting a first signal along a first transmission path and for transmitting a second signal along a second transmission path;

a receiver, located at a second location, for receiving a first reflected signal, wherein said first reflected signal is said first signal reflected at the first altitude, and for receiving a second reflected signal, wherein said second reflected signal is said second signal reflected at the first altitude; and a signal processing means, coupled to said receiver and to said transmitter, for determining the wind velocity at the first location based upon said first and second reflected signals.

15. The system of claim 14, wherein said signal processing means determines that said first and second reflected signals reflect at the first altitude.

16. The system of claim 15, wherein said signal processing means determines a first distance between said first location and said first altitude, along said first transmission path according to a distance equation, which is:

$$R = \frac{Z_0 - Z}{\sin(\delta)\cos(\alpha) - \cos(\delta)\sin(\alpha)\cos(\phi)}$$

where R is said first distance, $Z_0$ is an altitude of said second location, Z is said first altitude, and $\delta$ is a depression angle, $\alpha$ is a scan half-angle, and $\phi$ is a scanner phase angle associated with said first reflected signal.

17. The system of claim 14, wherein a frequency associated with said first reflected signal differs from a frequency associated with said first signal, and wherein said frequency difference is related to the wind velocity at the first altitude.

18. The system of claim 15, wherein said first location is the same as said second location.

* * * * *